United States Patent [19]

White

[11] 3,810,152
[45] May 7, 1974

[54] METHOD AND APPARATUS FOR CONVERSION OF A VARIABLE RESISTANCE TO A TIME MODULATED SIGNAL AND FOR ANALOGUE RESTORATION

[75] Inventor: James A. White, N. Granby, Conn.

[73] Assignee: Becton, Dickenson and Company, Rutherford, N.J.

[22] Filed: Oct. 13, 1972

[21] Appl. No.: 297,428

[52] U.S. Cl. .................. 340/347 NT, 340/347 AD
[51] Int. Cl. ........................................... H03k 13/02
[58] Field of Search ...... 340/347 NT, 206, 347 AD, 340/347 CC, 347 SH; 324/62, 99 D, 99 R

[56] References Cited
UNITED STATES PATENTS

| 3,613,112 | 10/1971 | Kanter | 340/347 AD |
| 3,657,653 | 4/1972 | Wilkinson | 340/347 AD |
| 3,662,377 | 5/1972 | Dym et al. | 340/347 NT |

Primary Examiner—Thomas A. Robinson

[57] ABSTRACT

A variable unknown resistance representing any variable parameter which may be converted to a resistance is converted to a time modulated signal wherein a time interval representing the unknown resistance is measured along a time base from an initial time, against a second time interval representing a full scale also measured along the same time base from the same initial time so that the time interval representing the unknown resistance is proportional to the second time interval. An analogue restoration of the time interval representing the unknown resistance is obtained by comparing the full scale time interval to a reference voltage in a manner such that the ratio of the analogue voltage $e_{OUT}$ representing the unknown resistance to the reference voltage $e_{REF}$ is equal to the ratio of the time interval representing the unknown resistance to the full scale time interval. The time modulated signal may be pulse position modulated or pulse width modulated with the same result being obtained using slightly different circuits. The method of the invention keeps the output independent of system variables.

Figure 3:
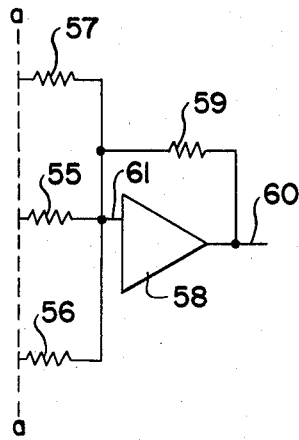

15 Claims, 9 Drawing Figures 3,810,152

SHEET 1 OF 3

METHOD AND APPARATUS FOR CONVERSION OF A VARIABLE RESISTANCE TO A TIME MODULATED SIGNAL AND FOR ANALOGUE RESTORATION

The invention relates to a method and apparatus for determining the value of a variable resistor.

The invention has particular application for measuring an unknown parameter such as temperature, pressure acceleration and displacement to mention a few commonly measured parameters using a parameter sensing resistor such as a thermister, and a potentiometer. Other parameters may be measured and other parameter sensing resistors may be used within the scope of this invention.

It is an object of this invention to provide an electrical system with a minimum of complexity and stability requirements for the data collection and data transmission parts of a data handling system. The invention imposes no power supply regulation requirements, nor voltage controlled oscillator stability requirements or linearity requirements when used with an FM-FM transmission system and thus is an improvement over prior art systems which impose such requirements.

This invention provides a pulse position modulated (PPM) indication, or a pulse width modulated (PWM) indication of an unknown resistance as a ratio of a first time interval measured along a time base from an initial time to a second time interval representing a full scale and measured along the same time base from the initial time. The invention comprises a first voltage divider including the unknown resistance for producing a voltage representing the unknown resistance. Two additional voltage dividers are connected to the same voltage source as the first voltage divider and are adjusted to define a low voltage limit and a high voltage limit indicative of the voltage range over which the unknown resistance can be expected to vary. A ramp generator is provided to generate a ramp voltage to which the output from each voltage divider is compared. A low limit comparator, a parameter comparator and a high limit comparator are provided by means of which the output from each of the three voltage dividers are compared to the ramp voltage. The three comparators change state in timed succession as the ramp voltage increases to the level of the output voltage from the voltage divider to which a particular comparator is connected. The low limit comparator which is connected to the low limit voltage divider changes state when the ramp voltage equals the low limit voltage from the low limit voltage divider and provides a zero time signal. The high limit comparator which is connected to the high limit voltage divider changes state when the ramp voltage equals the high limit voltage and provides a signal which delineates the end of a full scale time interval measured from the zero time signal. The parameter comparator which is connected to the voltage divider including the unknown resistance changes state when the ramp voltage equals the voltage representing the unknown resistance and provides a signal which delineates a time interval representing the unknown resistance measured from the zero time signal.

In analogue reconstruction the ratio of the parameter time interval to the full scale time interval may be compared to a reference voltage in order to obtain an output analogue voltage representing the unknown parameter which is proportional to the reference voltage as the parameter time interval is to the full scale time interval. The analogue reconstruction apparatus includes a ramp generator which is controlled by the zero time signal to start the ramp from zero volts, an output sample and hold circuit which is controlled by the parameter time signal to sample the ramp and produce an output voltage equal to the ramp voltage at the parameter time, a reference voltage source, a summing means for providing an error voltage which is the algebraic difference between the ramp voltage and the reference voltage, an error sample and hold circuit which is controlled by the full scale time signal to sample the error voltage from the summing amplifier at the time of the full scale pulse and produce an error voltage, and a feedback means from said error sample and hold circuit to said ramp generator for changing the slope of the ramp to reduce the error signal.

This discussion explains the concept in terms of analog circuitry but it is obvious that the use of digital circuitry is equally as useful in implementing actual systems.

Figure 1:
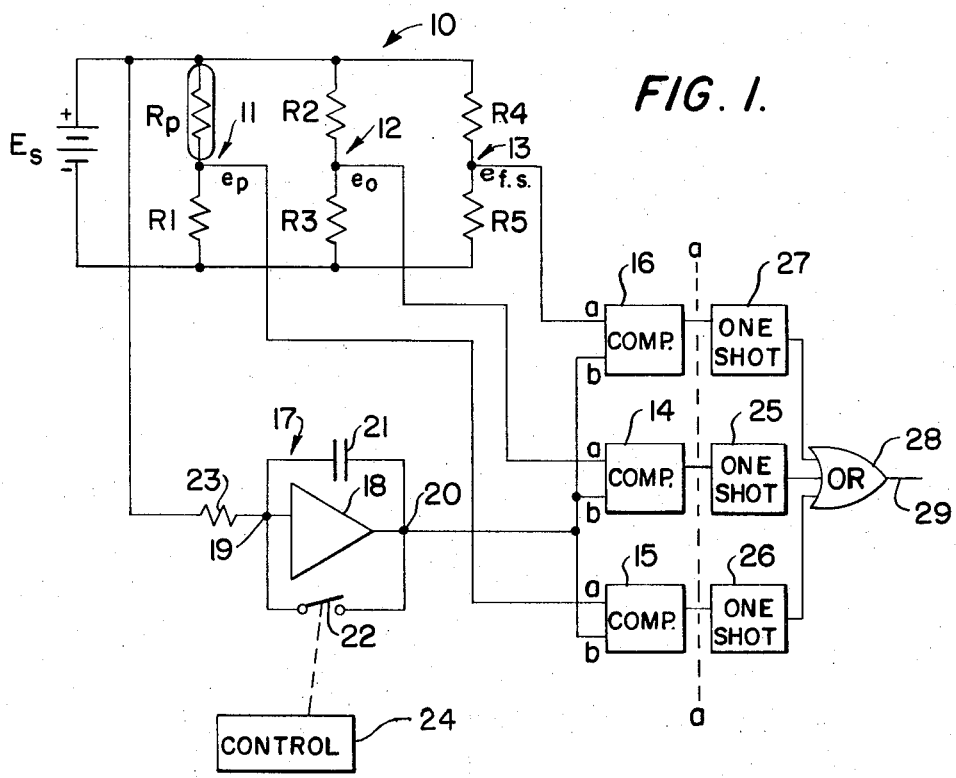
Figure 2:
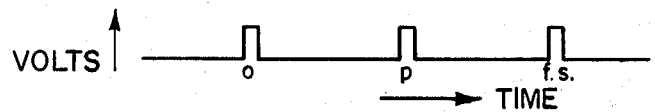
Figure 6:
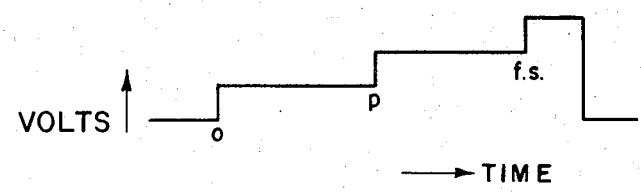
Figure 4:
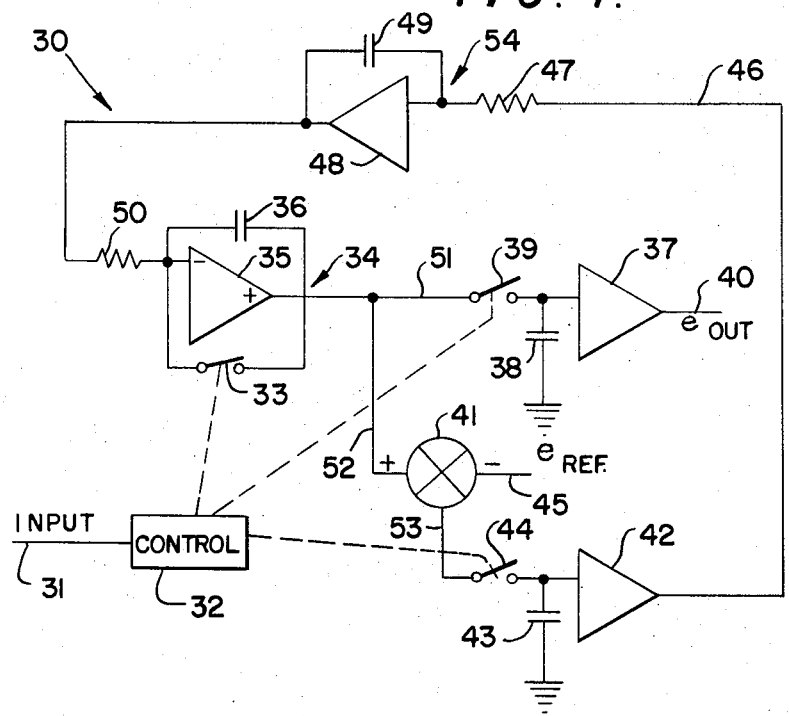
Figure 5:
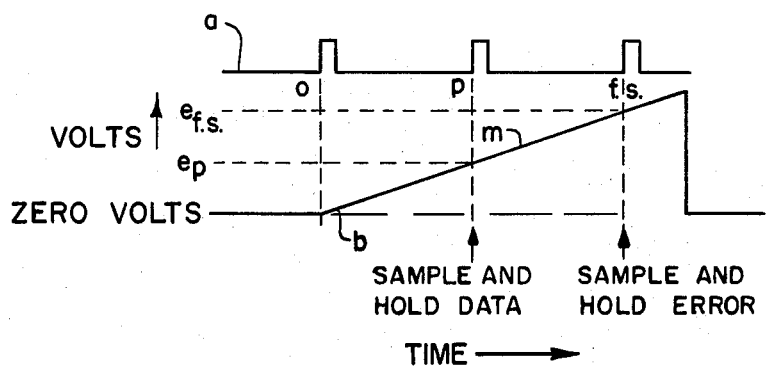
Figure 7:
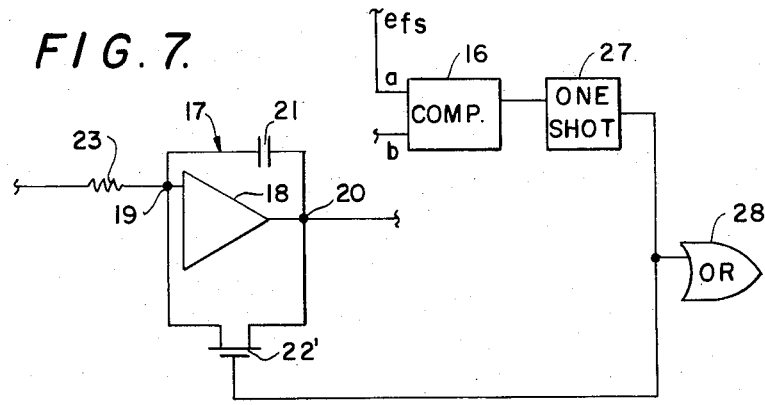
Figure 8:
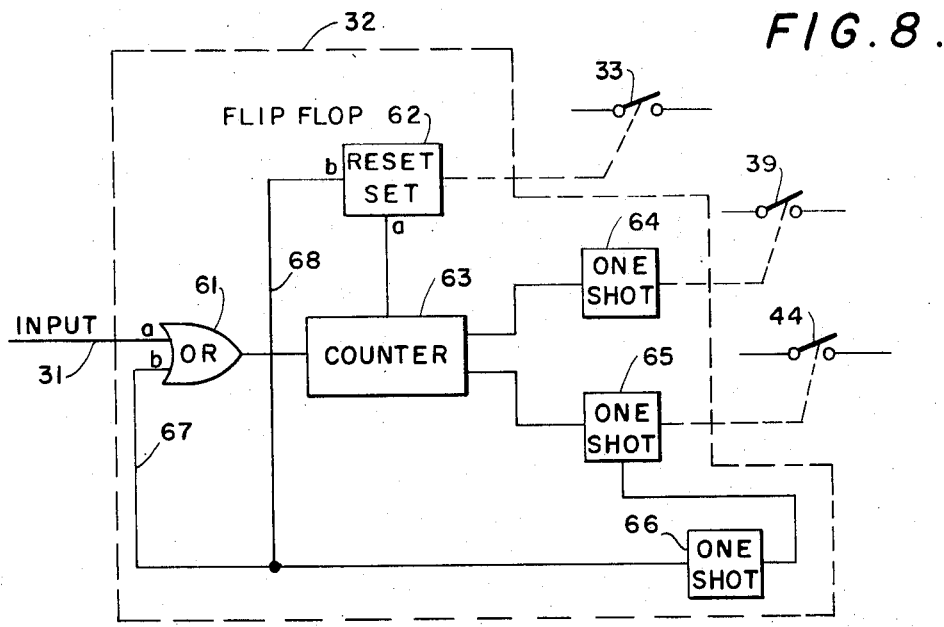
Figure 9:
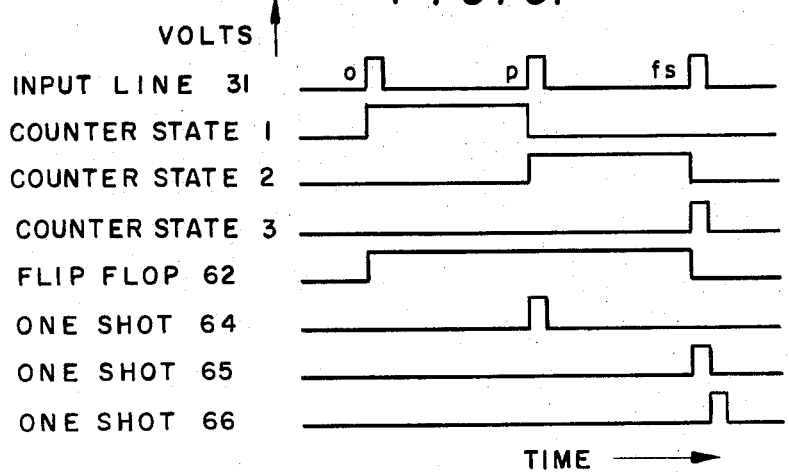

With the foregoing objects and features in view and such other objects and features which may become apparent as this specification proceeds, the invention will be understood from the following description taken in conjunction with the accompanying drawings in which like characters of reference designate like parts and in which:

FIG. 1 is a combined block and schematic diagram illustrating one embodiment of the invention, FIG. 2 is a graph illustrating a pulse position modulated signal output from the apparatus shown in FIG. 1, FIG. 3 is a schematic diagram showing circuit elements which may be substituted for the circuit elements to the right of line a—a in FIG. 1, to produce a second embodiment of the invention, FIG. 4 is a combined block and schematic diagram showing an analogue restoration circuit which may be used to decode the time period information which is generated by the apparatus illustrated in FIGS. 1 and 3, FIG. 5 is a graph showing the operational time sequence of the apparatus of FIG. 4 when connected to receive pulse position modulated signals from the apparatus shown in FIG. 1, FIG. 6 is a graph illustrating a pulse width modulated signal which is generated when the apparatus shown in FIG. 3 is combined with the apparatus shown in FIG. 1 to the left of line a—a in substitution for the circuit elements to the right of line a—a, FIG. 7 is a fragmentary schematic view of a portion of the system illustrated in FIG. 1 showing a preferred form of the control 23 and switch 22 illustrated in FIG. 1, FIG. 8 is a fragmentary view of a portion of the system illustrated in FIG. 4 showing a preferred form of the control device represented by the block 32 in FIG. 4, FIG. 9 is a voltage-time graph illustrating the time sequence relationship of events occurring within the control 32 illustrated in FIG. 8.

Referring now to FIG. 1 a generalized block diagram is shown of a circuit 10 for converting an unknown resistance $R_p$ representing a specific variable parameter into a pulse position modulated signal. $R_p$ may be any variable resistance used as a parameter sensing device.

A thermistor is an example of one such device used for sensing temperature variations, but other parameter sensing resistances may be used. The variable parameter resistance $R_p$ is connected in a voltage divider circuit 11 in series with a resistor R1 across a d.c. voltage source Es. The junction between $R_p$ and R1 provides an output terminal from which a voltage $e_p$ representative of the parameter voltage is taken. Two additional voltage dividers 12 and 13 are connected across the common power source Es to provide voltages which will be the low limit and the high limit of the variable resistance voltage divider 11. The voltage divider 12 comprising resistors R2 and R3 in series is adjusted to provide a low limit voltage $e_o$ at the common junction of R2 and R3; the voltage divider 13 comprising resistors R4 and R5 is adjusted to provide a high limit voltage $e_{fs}$ at the common junction between R4 and R5. The three voltage outputs $e_o$ (low limit), $e_{fs}$ (high limit) and $e_p$ (parameter) are connected to one input $a$ of analog voltage comparators 14, 16 and 15 respectively. The other input $b$ to comparators 14, 15 and 16 is taken from the output of a ramp voltage generator 17 which has a voltage rise from less then $e_o$ to greater than $e_{fs}$.

The ramp generator 17 which may also be referred to as an integrator comprises an amplifier 18 having an input terminal 19 and an output terminal 20, an integrating capacitor 21 connected across the amplifier 18 and a switch 22 which also shunts the amplifier. The input terminal 19 of the ramp generator is connected through resistor 24 to the positive side of the power source Es. A control 23 is provided to open and close the switch 22 according to a predetermined time sequence. Although the switch 22 is illustrated to be a simple mechanical switch, other switching means may be used to open and close the shunting circuit for the integrating capacitor 21. Closing of the switch 22 shorts the capacitor 21 and resets the ramp generator 17 to an initial condition while opening of the switch 22 permits the ramp generator to operate to produce a steadily rising voltage at terminal 20 as the integrating capacitor 21 charges. The control 24 is a device which will recognize some particular condition of the circuit and cause switch 22 to close and after a suitable time delay will open the switch 22 to allow the ramp generator 17 to operate. By way of illustration as shown in FIG. 7, a transistor 22' may be used in place of the switch 22 and control 24. The output of comparator 16 which is supplied with $e_{fs}$ will be coupled through one shot 27 to the base of the transistor 22' and will cause it to conduct when the ramp voltage exceeds $e_{fs}$. By coupling the output voltage from the comparator 16 into a gate of an MOS transistor, the time during which the transistor 22' is turned on can be controlled by the one shot 27. The transistor 22' thus takes the place of the switch 22, and the output voltage from the comparator 16 coupled to the gate of the transistor 22' provides the control function of the control 24.

The voltage comparators 14, 15 and 16 are preferably operational amplifiers that are used in the open loop mode. As the output ramp voltage from ramp generator 17 sweeps through its voltage excursion the three comparators 14, 15 and 16 will successively change state as the ramp voltage exceeds the output voltage from the voltage dividers 12, 11 and 13 respectively. One shot multivitrators 25, 26 and 27 are connected to the output terminals of comparators 14, 15 and 16 respectively. As each of the comparators 14, 15 and 16 change state their output voltage triggers the one shot multivibrators 25, 26 and 27 in succession to produce short duration pulses. The output pulses from the one shot multivibrators 25, 26 and 27 are fed to separate input terminals of an OR gate 28 which successively conducts in response to each input pulse to produce a pulse position modulated signal as illustrated by curve $a$ in FIG. 2. Using the leading edge of each pulse as an indicator of specific times an initial time is indicated by $o$, a time representing the parameter is indicated by $p$ and a full scale time is indicated by $f_s$. Thus in the manner as above described the position of the parameter pulse $p$ bears a ratio relationship to the initial and full scale pulses $o$ and $f_s$, which is independent of variations of the power source voltage Es and ramp rates of the ramp generator 17.

The pulse position modulated signal derived from the apparatus disclosed in FIG. 1 and taken from the OR gate output terminal 29, may be fed to an analogue restoration circuit which derives from the pulse position modulated signal a precise analogue value of the variable parameter being measured. A preferred analogue restoration circuit is illustrated in FIG. 4 and is generally indicated by the reference numeral 30. Input signals such as derived from the output terminal 29 of the OR gate in FIG. 1 are fed through input line 31 of the analogue restoration circuit 30 to a control counter illustrated by the block 32. The control device 32 is preferably a resettable counter which may be reset to the zero state. For purpose of explanation the counter 32 will be assumed to be initially in a reset or zero state. When the O pulse as illustrated in FIG. 2 occurs, the counter 32 will advance to a state of one and will cause the switch 33 which normally shunts the integrator 34 to open. The integrator 34 includes an operational amplifier 35 having an integrating capacitor connecting its input and output terminals and the shunting switch 33. When the switch 33 is closed the operational amplifier has zero output voltage. When the switch 33 is opened upon the occurrence of the O pulse a ramp voltage as illustrated by curve $b$ in FIG. 5 is generated.

The ramp signal output from the integrator 34 is fed via line 51 and switch 39 to an output sample and hold circuit including amplifier 37, and capacitor 38 connected from the input terminal of amplifier 37 to ground. The output lead 40 from the amplifier 37 carries an output voltage $e_{OUT}$ which is an analogue value of the variable parameter being measured.

The ramp signal output from the integrator 34 is also fed via line 52 to a summing amplifier 41 which provides an output voltage which is the algebraic difference between the ramp voltage and a fixed reference voltage $e_{REF}$. The difference voltage from the summing amplifier 41 is fed via line 53 and switch 44 to a second sample and hold circuit including amplifier 42 and capacitor 43 connected between the input terminal of amplifier 42 and ground. The output from the second sample and hold circuit amplifier 42 is connected through a feedback path 46 to the input of integrator 34 for the purpose of adjusting the slope $m$ of the ramp signal produced by the integrator 34. The feedback path 46 includes an integrator 54, comprising operational amplifier 48 and integrating capacitor 49, connected intermediately between series resistors 47 and 50. The integrator 54 presents a new voltage level input to the ramp generator 34 each time there is a change in the error signal in the feedback path 46.

FIG. 5 shows the time relationship between the pulse input curve a being fed to the control counter 32, and the ramp voltage curve b from the integrator 34. The control counter 32 functions to operate the switches 33, 39 and 44 in timed sequence in the order named upon the occurrence of the pulses $o$, $p$, and $fs$ illustrated in curve a of FIG. 5. As previously stated the occurrence of pulse $o$ advances the counter 32 from the zero state to a state of one and causes switch 33 to open. This opening of switch 33 removes the shunt from the integrating capacitor 36 and permits it to charge toward the level of the voltage being fed to it through resistor 50. A ramp voltage is thus generated by the integrator 34 which starts at zero upon the occurrence of pulse $o$ and climbs along a slope $m$ which is determined by the voltage level of the voltage appearing at the input terminal of the integrator 34. When the pulse $p$ occurs the control counter 32 will advance to state two and will cause switch 39 to close for a short period of time. While switch 39 is closed, the capacitor 38 which is connected to the input of amplifier 37 of the output sample and hold circuit will assume the voltage $e_p$ (see FIG. 5) of the ramp b at the time the pulse $p$ occurs. When switch 39 is opened the voltage $e_p$ will remain on the capacitor 38 and will drain off at a rate determined by the resistance in parallel with it. The amplifier 37 presents a high input impedance so that the discharge time for capacitor 38 is long compared to the period between samples thus providing a device which can sample an input voltage and remember it for the time required.

When the full scale pulse $fs$ occurs the control counter 32 advances to state 3 and closes switch 44 for a short period. While switch 44 is closed the capacitor 43 which is connected to the input of the error sample and hold circuit amplifier 42 will assume the voltage output from the summing point 41. When the ramp voltage at the time of pulse $fs$ equals the reference voltage $e_{REF}$ the output from the summing point 41 is zero which is the value that is sampled and held by the error sample and hold circuit amplifier 42. If the ramp voltage $e_{fs}$ does not equal the reference voltage $e_{REF}$ at time of pulse $fs$, either a positive or negative voltage will be stored by the error sample and hold circuit and will provide an error signal to drive the integrator 54 in the feedback path 46. The integrator 54 will then present a new voltage level to the ramp generator 34 which will cause the ramp slope, i.e., volts per unit of time, to change. The direction of change is such as to cause the error signal from the summing point 41 to be decreased, thus driving the ramp in a direction to make the ramp voltage at the time of pulse $fs$ equal to the reference voltage $e_{REF}$. After a short period the control counter 32 is reset and then awaits the next pulse $o$ when it begins another cycle.

Instead of providing a pulse position modulated signal as shown in FIG. 2 which is an indication of an unknown parameter as a ratio of time between first and second pulses and a time between first and third pulses, a pulse width modulated signal as shown in FIG. 6 may be provided which is an indication of an unknown parameter as a ratio of one pulse width op relative to a full scale pulse width $o-fs$.

A pulse width modulated signal as shown in FIG. 6 may be produced using the circuit shown in FIG. 1 to the left of dotted line a—a anu substituting the circuit shown in FIG. 3 for the circuit elements shown to the right of line a—a in FIG. 1. Resistors 55, 56 and 57 would be connected on one side respectively to the output terminals of the low limit comparator 14, the parameter comparator 15, and the high limit comparator 16, and on their other side to the input terminal 61 of operational amplifier 61. A resistor 59 is connected in a feedback path between the output terminal 60 and the input terminal 61 of the operational amplifier 58. The output signal from the operational amplifier 58 will be proportional to the sum of the input signals. Thus, if one comparator has changed state the output signal will be one unit in amplitude, for two comparators changing state the output signal will be two units amplitude and etc. The result is a pulse width modulation with the period from O to P being a function of the amplitude of the input signal and the period from O to $f.s.$ a function of the preselected full scale value.

FIG. 8 is illustrative of a preferred form of the control device 32 shown in block form in FIG. 4. The control device 32 shown within the dotted lines includes resettable counter 63 which is fed input signals from OR gate 61 and supplies an output pulse to one terminal a of flip-flop 62 in state one, an output pulse to one-shot multivibrator 64 in state two, and an output pulse to one-shot multivibrator 65 in state three. The flip-flop 62, one-shot multivibrator 64, and one-shot multivibrator 65 actuate the switches 33, 39 and 44 included in the circuit shown in FIG. 4. The switches 33, 39 and 44 will preferably be solid state switches which are controlled by signals from the flip-flop 62, the one shot multivibrator 64 and the one shot-multivibrator 65 respectively. Another one-shot multivibrator 66 is controlled by the one-shot multivibrator 65 to provide reset signals over branch lines 67 and 68 to the b input terminals of OR gate 61 and flip-flop 62. A train of input pulses such as shown in FIG. 5 may be fed to the a input terminal of OR gate 61 over line 31 from OR gate 28 in FIG. 1. A pulse on either line 31 or line 67 when fed into OR gate 61 will cause the counter 63 to advance to its next state.

The control sequence of the control device 32 is now described assuming an initial condition when the counter 63 is in a zero state and the system is awaiting the arrival of the zero pulse shown in FIG. 5 over line 31 to the OR gate 61. When the zero pulse occurs, the OR gate 61 transmits a pulse to the counter 63 and causes it to advance to state one which sets flip-flop 62 and opens the switch 33 to start the ramp voltage b (FIG. 5). Upon the arrival of the p pulse, the counter 63 advances to state two and causes one shot 64 to set which closes switch 39 for the period of the one shot 64. On the arrival of the $f.s.$ pulse, the counter 63 advances to its third state and causes one shot 65 to set closing switch 44 for the time period of one shot 65. When one shot 65 resets, i.e., flips back to its initial state, the one shot 66 is set which causes a reset pulse to appear on branch lines 67 and 68. The reset pulse on line 68 causes flip-flop 62 to switch its initial state which closes switch 33. The reset pulse on line 67 triggers OR gate 61 which supplies a pulse to counter 63 advancing it to its zero state again.

In FIG. 9 voltage-time graphs are shown which indicate the time relationship of the input signals on line 31, the different states of the counter 63, and the periods when flip-flop 62, one shot 64, one shot 65, and one shot 66 are set.

The same control device as shown in FIG. 8 can be used with the pulse width modulated signal as shown in FIG. 6 if the wave form of FIG. 6 is differentiated and the resulting pulses for each level transition are used to drive the counter 63 (FIG. 8).

The method of the invention will be apparent from the above description but is more precisely stated as a method for creating a time ratio indication of resistance and for reconstruction of a precise voltage indication of the resistance, the resistance being of unknown value subject to variation and representative of a selected parameter. The method comprises simultaneously creating a parameter voltage proportional to an unknown resistance, a high limit voltage, and a low limit voltage, the low limit voltage and the high limit voltages establishing a voltage range within which the parameter voltage is expected to remain, creating a first ramp voltage which gradually increases at a substantially constant rate from below the low limit voltage to at least the high limit voltage, comparing the low limit voltage, the parameter voltage and the high limit voltage, with the parameter voltage and producing a zero time delineating signal when the ramp voltage equals the low limit voltage, a parameter time delineating signal when the ramp voltage equals the parameter voltage, and a full scale time delineating signal when the ramp voltage equals the high limit voltage, the time interval between the parameter time delineating signal and the zero time delineating signal being proportional to the time interval between the full scale time delineating signal and zero time delineating signal, starting a second ramp voltage beginning at zero volts upon the occurrence of the zero time delineating signal, said second ramp voltage increasing at a predetermined constant rate, sampling and holding the ramp voltage upon the occurrence of the parameter time delineating signal to produce an output voltage representing a precise voltage indication of the resistance, comparing the ramp voltage with a reference voltage and producing an error voltage which is the algebraic difference between the ramp voltage and the reference voltage, sampling and holding the error voltage upon the occurrence of the full scale time delineating signal, using the sampled error voltage to change the rate of increase of the ramp voltage to reduce the error voltage at the time of the full scale time delineating signal to zero, periodically repeating the creation of the first ramp voltage and comparison of the low limit voltage, the parameter voltage and the high limit voltage therewith and production of periodically recurring zero time delineating signal, parameter time delineating signal, and full scale delineating signal, periodically repeating the creation of the second ramp voltage upon the occurrence of each successive zero time delineating signal, periodically sampling and holding the ramp voltage upon the occurrence of each successive parameter delineating time signal to produce an output voltage representing a precise voltage indication of the resistance, and periodically repeating the sampling and holding of the error signal upon the occurrence of each successive full scale time delineating signal.

While in this application an unknown resistance has been described as a particular parameter for which the method and apparatus of this invention is adapted to convert to a time modulated signal and for analogue restoration, it is not intended that the method and apparatus described herein be so limited. Any parameter which may be translated into a voltage or current which is representative of the parameter may be converted in accordance with this invention. The use of currents instead of voltages as representative of the parameter and the high and low limits of a scale against which the parameter is measured and a current ramp generator to produce a current ramp against which low and high limit currents and a parameter current are compared is also within the scope of this invention.

What is claimed is:

1. An electrical circuit for converting a parameter to a time period comprising a power source having a voltage $E_s$ across its terminals, a low limit voltage divider means for establishing a low limit voltage, a high limit voltage divider means for establishing a high limit voltage and a parameter voltage divider means including a parameter sensing resistor for establishing a parameter voltage, each one of said voltage dividers being connected in parallel with the other of said voltage dividers across said power source, a low limit voltage comparator having one input terminal connected to the low limit voltage divider means to receive said low limit voltage and a second input terminal for receiving a ramp voltage, a high limit voltage comparator having one input terminal connected to said high limit voltage divider means to receive said high limit voltage and a second input terminal for receiving said ramp voltage, a parameter voltage comparator having one input terminal connected to said parameter voltage divider means to receive said ramp voltage, and a second input terminal for receiving said ramp voltage, a ramp voltage generator means connected to said voltage source for periodically generating a ramp voltage which starts at zero volts and increases toward the voltage across the terminals of said power source with increasing time, said low level comparator, said parameter comparator and said high level comparator each changing states in succession as the ramp voltage exceeds the output of the low level voltage divider, the parameter voltage divider and the high level voltage divider respectively to establish time periods between the change of state of said comparators, short duration pulse producing means connected to each of said low limit comparator, said parameter comparator, and to said high limit comparator for producing a pulse each time said comparators change state, and means for combining said pulses along a time base to produce a pulse position modulated signal.

2. The apparatus set forth in claim 1, wherein said short duration pulse producing means are one shot multivibrators and wherein said means for combining said pulses along a time base is an OR gate.

3. An electrical circuit for converting a parameter to a time period comprising a power source having a voltage $E_s$ across its terminals, a low limit voltage divider means for establishing a low limit voltage, a high limit voltage divider means for establishing a high limit voltage and a parameter voltage divider means including a parameter sensing resistor for establishing a parameter voltage, each one of said voltage dividers being connected in parallel with the other of said voltage dividers across said power source, a low limit voltage comparator having one input terminal connected to the low limit voltage divider means to receive said low limit voltage and a second input terminal for receiving a ramp voltage, a high limit voltage comparator having one input terminal connected to said high limit voltage divider means to receive said high limit voltage and a second input terminal for receiving said ramp voltage, a parameter voltage comparator having one input terminal connected to said parameter voltage divider means to receive said parameter voltage, and a second input terminal for receiving said ramp voltage, a ramp voltage generator means connected to said voltage source for periodically generating a ramp voltage which starts at zero volts and increases toward the voltage across the terminals of said power source with increasing time, said low level comparator, said parameter comparator and said high level comparator each changing states in succession as the ramp voltage exceeds the output of the low level voltage divider, the parameter voltage divider and the high level voltage divider respectively to establish time periods between the change of state of said comparators and means responsive to the change of state of said comparators for producing an increasing stepped voltage signal output, the first voltage step occurring when said low level comparator changes state, the second voltage step occurring when said parameter comparator changes state and the third step occurring when said high limit comparator changes state.

4. The apparatus set forth in claim 3 wherein said means responsive to the change of state of said comparators includes an operational amplifier having a resistance feedback path between its output and input terminals, the input terminal of said operational amplifier being connected through parallel conductive paths to the output terminals of said low limit comparator, said parameter comparator and said high level comparator, and each of said parallel paths including a resistor.

5. The apparatus set forth in claim 1 together with an analogue restoration system comprising a decoding ramp generator producing a decoding ramp voltage increasing with time, an analogue output sampling circuit for sampling said decoding ramp voltage and providing for a period of time an output voltage equal to the decoding ramp voltage when sampled, a reference voltage source, a summing means for producing an error voltage which is the algebraic difference between the decoding ramp voltage and the reference voltage, an error sampling circuit for sampling the error voltage from said summing amplifier and holding said error voltage over a period of time, a feedback means connected from said error sampling circuit to said decoding ramp generator for changing the slope of the decoding ramp to reduce the error voltage signal, and control means which sequentially starts said ramp from zero volts at the time said low level comparator changes state, connects said analogue voltage sampling circuit to the output of said decoding ramp generator when said parameter comparator changes state, and which connects said error voltage sampling circuit to said summing amplifier when said high limit comparator changes state, said control means recycling and repeating its functions periodically.

6. A method for creating a time ratio indication of resistance and reconstruction of a precise voltage indication of said resistance comprising simultaneously creating a parameter voltage proportional to an unknown resistance, a high limit voltage, and a low limit voltage, said low limit voltage and said high limit voltages establishing a voltage range within which said parameter voltage is expected to remain, creating a first ramp voltage which gradually increases at a substantially constant rate from below said low limit voltage to at least said high limit voltage, comparing said low limit voltage, said parameter voltage and said high limit voltage, with said first ramp voltage and producing a zero time delineating signal when said first ramp voltage equals said low limit voltage, a parameter time delineating signal when said first ramp voltage equals said parameter voltage, and a full scale time delineating signal when said first ramp voltage equals said high limit voltage, the time interval between said parameter time delineating signal and said zero time delineating signal, being proportional to the time interval between said full scale time delineating signal and zero time delineating signal, starting a second ramp voltage beginning at zero volts upon the occurrence of said zero time delineating signal, said second ramp voltage increasing at a predetermined constant rate, sampling and holding said second ramp voltage upon the occurrence of said parameter time delineating signal to produce an output voltage representing a precise voltage indication of said resistance comparing said second ramp voltage with a reference voltage and producing an error voltage which is the algebraic difference between said second ramp voltage and said reference voltage, sampling and holding said error voltage upon the occurrence of said full scale time delineating signal, using said sampled error voltage to change the rate of increase of said second ramp voltage to reduce said error voltage at the time of said full scale time delineating signal to zero, periodically repeating the creation of said first ramp voltage and comparison of said low limit voltage, said parameter voltage and said high limit voltage therewith and production of periodically recurring zero time delineating signal, parameter time delineating signal, and full scale delineating signal, periodically repeating the creation of said second ramp voltage upon the occurrence of each successive zero time delineating signal, periodically sampling and holding said second ramp voltage upon the occurrence of each successive parameter delineating time signal to produce an output voltage representing a precise voltage indication of said resistance, and periodically repeating the sampling and holding of said error signal upon the occurrence of each successive full scale time delineating signal.

7. An analogue restoration system for converting a time ratio indication of a parameter resistance to an analogue voltage precisely representing said parameter resistance, said system receiving successively repeating time signals including a zero time delineating signal, a parameter time delineating signal and a full scale time delineating signal, said full scale time delineating signal being spaced from said zero time delineating signal by a time interval representing a full scale resistance and said parameter time delineating signal being spaced from said zero time delineating signal by a time interval representing said parameter resistance, said analogue restoration system comprising a decoding ramp generator producing a decoding ramp voltage increasing with time, an analogue output sample and hold circuit means for sampling said decoding ramp voltage and providing an analogue output voltage substantially equal to the decoding ramp voltage when sampled over a period of time, a reference voltage source, a summing means for producing an error voltage which is the algebraic difference between the decoding ramp voltage and the reference voltage, an error sample and hold circuit means for sampling the error voltage from said summing amplifier and holding said error voltage over a period of time, a feedback circuit means connected from said error sample and hold circuit to said decoding ramp generator for changing the slope of the decoding ramp to reduce said error voltage, and control means responsive to said successively repeating time signals for sequentially starting said decoding ramp generator to produce said decoding ramp starting at zero volts upon the occurrence of said zero time delineating signal, connecting said analogue voltage sample and hold circuit means to the output of said decoding ramp generator upon the occurrence of said parameter time delineating signal and connecting said error voltage sample and hold circuit means to said summing means upon the occurrence of said full scale time delineating signal, said control means having reset means causing the control means to recycle and repeat its functions periodically.

8. The apparatus set forth in claim 7 wherein said control means includes a resettable counter means which advances one step upon the occurrence of each successive time signal and resets after each full scale time delineating signal is received.

9. The apparatus set forth in claim 7 wherein said decoding ramp generator includes an operational amplifier having input and output terminals, an integrating capacitor connected between the input and output terminal of said operational amplifier and a shunting circuit having a first switch means therein for opening and closing said shunting circuit connected between the input and output terminals of said operational amplifier, said analogue output sample and hold circuit means including a second switch means fo9 opening and closing said analogue output sample and hold circuit, said error sample and hold circuit means having a third switch means for opening and closing said error sample and hold circuit means, said control means including a resettable counter having a zero state and three successive count states, means for applying said time signals to said counter for successively changing the state of said counter through said three successive count states, means responsive to said counter in its first count state for opening said first switch in said shunting circuit of said decoding ramp generator to start said ramp generator, means responsive to said counter in its second count state for closing said second switch for a predetermined time interval and means responsive to said counter in its third count state for closing said third switch for a predetermined time interval, said reset means including means operative after said counter is in its third count state to cause said counter to reset to zero and to cause said means responsive to said counter in its first state to close said first switch.

10. The apparatus set forth in claim 9 wherein said means responsive to said counter in its first state is a flip-flop multivibrator having one output state which causes said first switch to open and a second output state which causes said first switch to close, said means responsive to said counter in its second state and said means responsive to said counter in its third state being first and second one shot multivibrators respectively, said first and second one shot multivibrators changing state in response to said counter reaching its second and third count states respectively and returning automatically to a normal initial state after predetermined time intervals.

11. The apparatus set forth in claim 10 wherein said means operative after said counter is in its third count state to cause said counter to reset to zero and to cause said means responsive to said counter in its first state to close said first switch includes a third one shot multivibrator which changes state when said second one shot multivibrator returns to its initial state after responding to said counter in its third state, and circuit means connecting the output of said third one shot multivibrator to said counter for resetting same to zero and to said flip-flop multivibrator for changing it to its second output state.

12. The apparatus set forth in claim 11 wherein said control means further includes an OR gate connected to said counter for controlling same, said OR gate having a pair of input terminals, one for receiving said time signals and the other connected to said third one shot multivibrator for receiving a reset signal therefrom, said OR gate responding sequentially to said time signals and said reset signal to actuate said counter.

13. The apparatus set forth in claim 7 wherein said feedback circuit means includes an operational amplifier in circuit with resistance means, and an integrating capacitor connected across said operational amplifier.

14. The apparatus set forth in claim 1 wherein said ramp generator means includes an operational amplifier having input and output terminals, an integrating capacitor, a shunting circuit having normally open circuit interrupting means therein, said integrating capacitor and said shunting circuit each being connected across the input and output terminals of said operational amplifier, means connecting said input terminal of said operational amplifier to the high voltage side of said power source, means connecting the output terminal of said operational amplifier to the second input terminals of each of said low limit voltage comparator, said high limit voltage comparator, and said parameter voltage comparator, and means responsive when said high limit voltage comparator changes state as the ramp voltage exceeds the output of said high limit voltage divider to close said shunting circuit interrupting means for a brief time interval and thus reduce the output of said ramp voltage generating means to zero for the beginning of a new cycle.

15. The apparatus set forth in claim 14 wherein said shunting circuit interrupting means is a solid state switch, and said means for closing said shunting circuit interrupting means includes a one shot multivibrator connected in circuit between said high limit voltage comparator and said solid state switch for producing a control pulse for actuating said solid state switch to close said shunting circuit.

* * * * *